April 11, 1939.    J. SCHIERENBECK    2,153,644
METHOD OF COOLING GASES
Filed Sept. 30, 1936
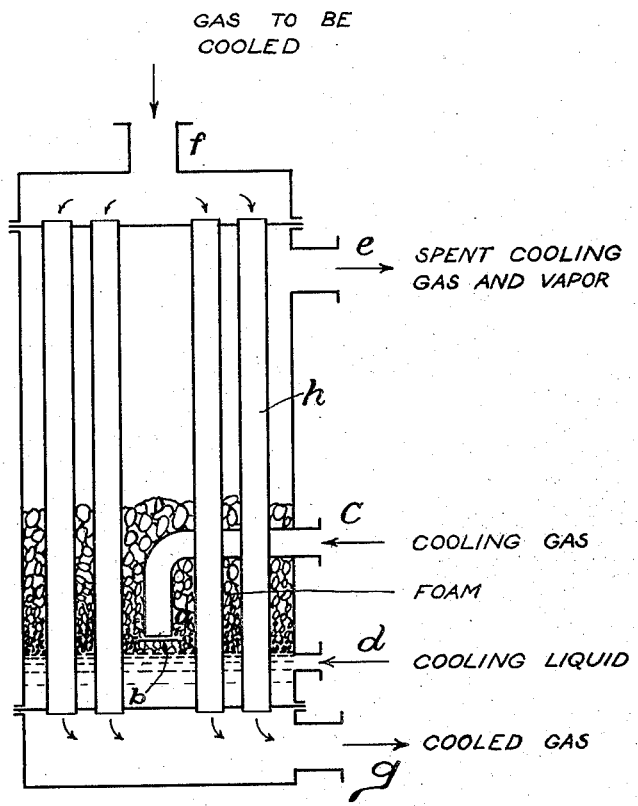
Julius Schierenbeck
INVENTOR
BY Hutz and Joslin
ATTORNEYS Patented Apr. 11, 1939

2,153,644

UNITED STATES PATENT OFFICE 2,153,644

METHOD OF COOLING GASES

Julius Schierenbeck, Heidelberg, Germany, assignor to I. G. Farbenindustrie Aktiengesellschaft, Frankfort-on-the-Main, Germany Application September 30, 1936, Serial No. 103,258
In Germany October 11, 1935

3 Claims.  (Cl. 62—176)

The present invention relates to a method of cooling gases, in particular to the cooling of gases having a high content of water vapor.

The cooling of hot gases having a high content of water vapor offers considerable difficulty because it is necessary to withdraw the great heat of condensation of the water vapor at the moment of condensation and this has only hitherto been effected by the use of extremely large amounts of cooling liquid. Thus for example in the conversion of carbon monoxide into hydrogen-containing gases by the use of steam, the cooling of the reacted gas from 150° to 60° C. with the simultaneous condensation of about 250 grams of steam per cubic meter of the gas requires, even with direct cooling, about 10 kilograms of cooling water per cubic meter of gas.

It has also been proposed to cool gases containing water vapor indirectly with mist produced by spraying water into air. The use of this mist reduces the amount of cooling liquid required but the resulting cooling action is not sufficient for many purposes, in particular in the above mentioned conversion of carbon monoxide into gases containing hydrogen by the action of steam. This is probably due to the fact that the liquid particles suspended in the mist cannot be evenly distributed over the cooling surfaces and that furthermore only a small portion of the said liquid particles comes into direct contact with the said surfaces. The heat transfer therefore takes place mainly to the gas carrying the liquid particles and then from the gas to these particles. In view of the poor heat conductivity of gas the heat transfer is consequently not satisfactory.

I have now found that the said difficulties can be overcome by employing a foam of gas and liquid for the indirect cooling of gases of the said kind, a fraction only of the amount of cooling water hitherto used being necessary. The said foam of gas and liquid is produced from gas other than that which is to be cooled. The gas containing water vapor to be cooled flows on one side of a cooling surface, preferably downwards, and the cooling foam of gas and liquid flows on the other side of the cooling surface, preferably upwards.

In this way, on the foam side of the cooling surface, as far as the foam reaches there are present at the same time both cooling water and cooling gas. The transfer of heat takes place from the cooling surface to the cooling water contained in the liquid films of the foam and thence to the cooling gas enclosed within the foam. In this way the heat of condensation set free at any point of the cooling surface that is in contact with the foam may be immediately utilized to evaporate cooling liquid from the liquid film into the cooling gas enclosed within the foam. Since with a foam the single films surrounding the gas bubbles are in direct contact with each other a good heat-transfer is effected from film to film over the whole foam and consequently even those films and the gas bubbles surrounded by them which are not in direct contact with the cooling surfaces have a cooling effect on these surfaces. Thus the coefficient of transfer of heat on the foam side is brought up to the value of the transfer coefficient on the other side (heat transfer of condensed water vapor), so that very small cooling surfaces and very small amounts of cooling water are sufficient. As compared with the use of mist the poor heat-transfer from the cooling surface to the cooling gas is replaced by the better heat-transfer to the liquid substance building up the foam. Cooling gas, however, is always present so that the heat evolved by condensation at any place of the hot part of the cooling surface may be dissipated immediately by evaporation of part of the foam liquid into the gas bubbles. By reason of the heating, the bubbles continually expand as they ascend (see the drawing) and the thickness of the film of liquid of the single bubbles thus continually decreases until finally the bubbles burst and the non-vaporized portion of the film of the bubbles is split up into quite a fine mist which ascends and vaporizes. Thus in this way the cooling gas, by utilizing the heat of condensation of the gas to be cooled, may be saturated with water vapor. In the cooling of the hot reacted gases from the reaction described above, the amount of cooling gas amounts for example only to 1/1.3 of the final amount of the gas to be cooled. Since cooling gas is continuously made up into a foam with the liquid the gas used up by saturation with evaporated liquid is replaced continuously by the introduction of fresh cooling gas.

The foam of gas and liquid may be produced in any suitable manner. For example the gas and the liquid may be mixed, with or without the addition of foaming agents, by stirring apparatus or by means of filter plates through which the gas is forced into the liquid. The most simple method of producing the foam is that illustrated in the drawing (representing in a diagrammatic manner a vertical section of an apparatus in which the cooling according to the present invention may be carried into practice) by using one or more nozzles in which the discharge end *a* of inlet pipe *c* for the gas is so screened by a simple deflecting plate *b* that the gas flows out at great speed, preferably horizontally. The considerable effect of a simple nozzle may be seen from the fact that, for example, by the introduction of cooling gas at a speed of 50 meters per second, the liquid is completely converted into a coherent foam extending from about 10 to 20 centimeters below the nozzle to about 150 centimeters above it. The foaming thus obtained, even without foaming agents, is of such efficiency that the foam produced, for example in the outer chamber of the tubular cooler shown in the drawing, is evenly distributed between the tubes. The gas supply nozzles may also be arranged laterally between the bundles of tubes and the outer jacket of the tubular cooler without impairing the action.

The nature of the invention will be further described by the following more detailed explanation of the operation of the apparatus shown in the drawing; but it is to be understood that the invention is not restricted to the particular apparatus shown.

Referring to drawing, cooling gas is supplied at *c* and cooling water at *d*, while gas saturated with water vapor, and preheated, leaves at *e*. The gas to be cooled enters at *f* and leaves through the pipe *g* after flowing through the cooling tubes of the cooler.

With the same cooling surface and the same amount of cooling agent, the amount of water vapor withdrawn by condensation is about 3½ to 4 times as great as when the cooling gas is passed through the gas chamber of the tubular cooler without the formation of foam.

The process according to this invention is obviously also capable of use for the cooling of dry gases or of gases having but a slight moisture content. In this case the foam cooling offers the great advantage that the cooling action on the cooling side can be increased to a marked degree whereas increasing the heat transfer for example by increasing the speed of the cooling agent is generally impossible in tubular coolers since the area of the space around the tubes is usually very large.

Instead of the cooling surfaces being vertical, they may also be inclined or horizontal.

What I claim is:

1. A process for cooling hot gases which comprises bringing them into indirect heat-exchange relation with a foam of gas and liquid having a lower temperature than the said hot gases, said foam being produced from a liquid and a gas other than the hot gas to be cooled.

2. The process as claimed in claim 1 wherein the foam is produced by passing the gas other than the hot gas to be cooled at a high speed through narrow apertures into the cooling liquid.

3. The process for cooling hot gases which comprises directing a stream of hot gases along a predetermined path having a portion of the path in heat exchanging relation with a liquid and so projecting a stream of cooling gas against said liquid as to cause the formation of foam which foam tends to move in heat exchanging relation and counter current to the stream of hot gases.

JULIUS SCHIERENBECK.